Figure 1:
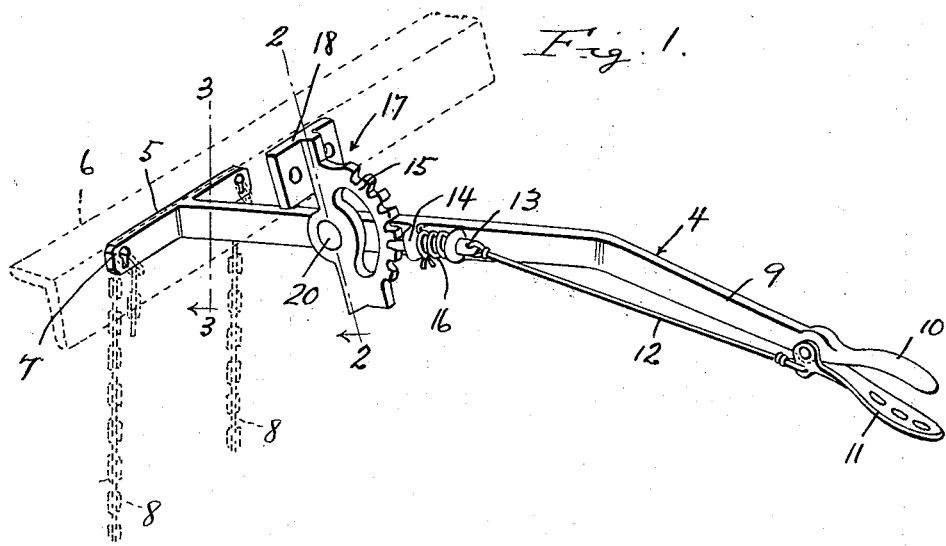

May 24, 1932.  C. PFLUM ET AL  1,860,200

FENDER ADJUSTING MEANS

Original Filed Feb. 26, 1930

Inventors
Carl Pflum
Norba Guerin

By Clarence A. O'Brien
Attorney

Patented May 24, 1932

1,860,200

UNITED STATES PATENT OFFICE

CARL PFLUM AND NORBA GUERIN, OF CONNERSVILLE, INDIANA

FENDER ADJUSTING MEANS

Application filed February 26, 1930, Serial No. 431,560. Renewed April 16, 1932.

This invention relates to adjusting and regulating means for plant and fender guards such as are employed on agricultural machines of various kinds. The invention has more particular reference to an appliance in the nature of an attachment which is expressly, but not necessarily, adapted to fit on the right hand side of a McCormack-Deering two-row corn plow.

The present system requires that the plow be stopped and the driver must regulate each of the four individual fenders one at a time with the fender chains. This requires from three to five minutes time. This operation is seldom if ever performed by the farmer because the present system is too unhandy and requires too much of his time to be changing back and forth as the condition of the field demands.

Tall or short corn, weedy or clean corn, rough or fine ground, back furrow or dead furrow all require certain operations from the fenders that cannot be performed with ease or speed with the present system. Therefore the corn does not get the correct attention it should get and does not produce as much as it should produce.

Our device bolts direct to the frame in the exact center between the two slots that at present hold the fender chains of the McCormack-Deering two-row plow.

With this system bolted to the frame as described, an operating lever itself swings just under the cross member of the frame and is bent to fit between the two levers that raise and lower the gangs. The chains are then fastened in the key-hole slots on the cross member of the lever, the same as they were fastened on the frame.

From this position the chains will not have to be moved again during the entire plowing season. When the difference in the corn or the ground require a different position of the fenders all that is necessary to alter that position is to grip the handle of the lever, releasing the plunger and raising or lowering another notch as desired.

In the drawings:

Figure 1 is a perspective view of the appliance showing a fragmentary portion (in dotted lines) of the frame of the machine as well as the dotted depending fender chains.

Figure 2:
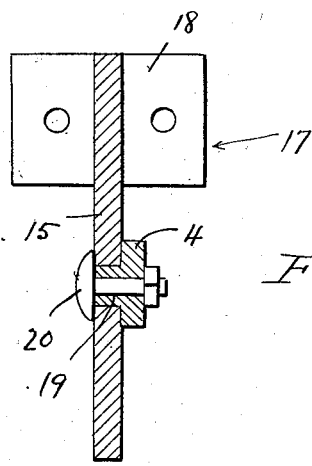
Figure 3:
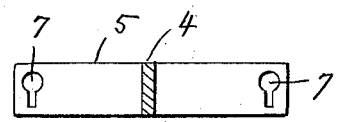

Figures 2 and 3 are sectional views on the lines 2—2 and 3—3 respectively of Figure 1.

The attachment comprises a major part in the nature of a lever generally designated by the reference character 4. The inner end portion of this is provided with a cross head 5 located in spaced relation and rearwardly of the frame 6 of the machine (not shown).

The ends of this cross-head are formed with key-hole shaped slots 7 in which the chains 8 leading down to the fenders are adjustably mounted. The fenders are not shown. The outer end portion of the lever is offset as at 9 and terminates in a handgrip 10. Pivotally mounted on this is a companion grip 11 which constitutes an operating member for a pull wire 12. This pull wire is connected with a headed locking pin 13 extending through a guide 14 and engaging the teeth of the retaining segment 15. The numeral 16 designates a spring between the head of a locking pin and the guide 14 for holding the pin seated.

The gear segment is formed integral with an attaching bracket 17. The attaching bracket comprises an apertured plate 18 which is bolted or otherwise fastened to the frame bar 6. The toothed segment includes a bearing hole in which a pintle forming projection 19 on the lever is rockably mounted. The numeral 20 designates a retaining bolt for fastening the lever to the segment.

The device herein shown and described is characterized by simplicity and economy in manufacture and sale. It can be readily installed by unskilled hands, and is susceptible of expeditious manipulation. It is only necessary to drill four holes in the frame to accommodate the device when it is used in duplex arrangement for a double-row cultivator.

Considering the handle as one piece, our idea has but two parts; the handle and the quadrant, whereas the prior art devices require many separate parts. Therefore it can be seen that our idea has practically no wear-out to it and if accidentally broken it can be removed and repaired in less than one-fourth the time required for a similar regulator. Being less complicated, it can be seen that it is sturdy, solid, reliable and efficient.

Then, too, it has the advantage of being able to operate either side separately from the other side. Perhaps a corn row would be in a back furrow or a dead furrow, then one side would have to be higher or lower than the other side to compensate for the difference in the ground.

Also there is absolutely no parts that can wear out. The bolt that holds the quadrant to the handle has no wear, weight or pressure upon it, as this is taken care of by a hollow extension on the handle (being cast there as a part of the handle) that passes through the hole in the quadrant, being flush on the opposite side and the bolt passing through this hole, therefore the only duty this bolt performs being to hold the handle against the quadrant sufficiently loose to operate easily.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

We claim:

An attachment for adjusting the fenders of an agricultural implement comprising a bracket adapted to be connected to a part of the implement frame, a segment formed with the bracket and having a part depending therefrom, a hand lever having a bearing forming projection on one side thereof, the segment having a hole therein to receive said projection, a pivot bolt passing through the projection and the lever for holding the projection in the opening in the segment, a cross piece on one end of the lever having key hole shaped slots therein for receiving the chains of the fenders, a spring pressed pawl carried by the lever and adapted to engage the teeth of the segment, a hand grip pivotally connected with the lever and associated with the hand part thereof, and a link between the hand grip and the pawl.

In testimony whereof we affix our signatures.

CARL PFLUM.
NORBA GUERIN.